J. A. IRVING.
TOBACCO PIPE.
APPLICATION FILED MAY 23, 1908.

937,073.

Patented Oct. 19, 1909.

Witnesses:
William W. Irish.
Katharine Sexton.

Inventor,
James A. Irving
By John D. Morgan
Attorney.

UNITED STATES PATENT OFFICE.

JAMES A. IRVING, OF BRIDGEPORT, CONNECTICUT, ASSIGNOR TO WIZARD PATENT DEVELOPING COMPANY, A CORPORATION OF NEW YORK.

TOBACCO-PIPE.

937,073.

Specification of Letters Patent. Patented Oct. 19, 1909.

Application filed May 23, 1908. Serial No. 434,664.

*To all whom it may concern:*

Be it known that I, JAMES A. IRVING, a citizen of the United States, residing at Bridgeport, in the county of Fairfield and State of Connecticut, have invented new and useful Improvements in Tobacco-Pipes, of which the following is a specification.

The invention relates to tobacco pipes.

Objects of the invention are to provide a pipe which is safe as regards fire; which is protected from the elements when used outdoors; which may be conveniently placed in the pocket when lighted; which provides a cool and hygienic smoke; which may be manipulated simply and rapidly; which may be thoroughly and readily cleaned and which, while possessing these features, is of compact structure and attractive appearance. These and other objects of invention will in part be obvious and will in part more fully appear herein.

The invention consists in the novel articles, parts, improvements and combinations herein shown and described.

The accompanying drawings, referred to herein and forming a part hereof, illustrate one embodiment of the invention, the same serving in connection with the description herein to explain the principles of the invention.

Figure 1:
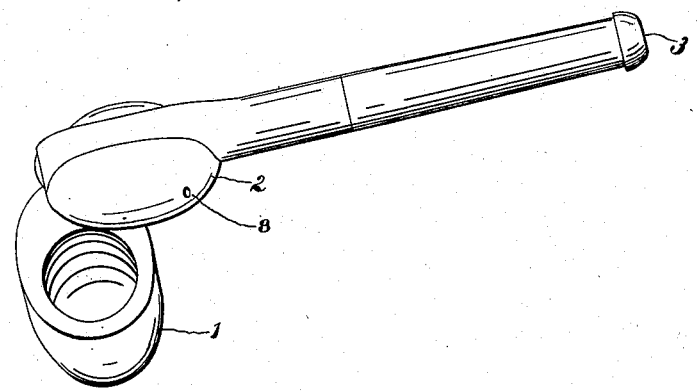
Figure 2:
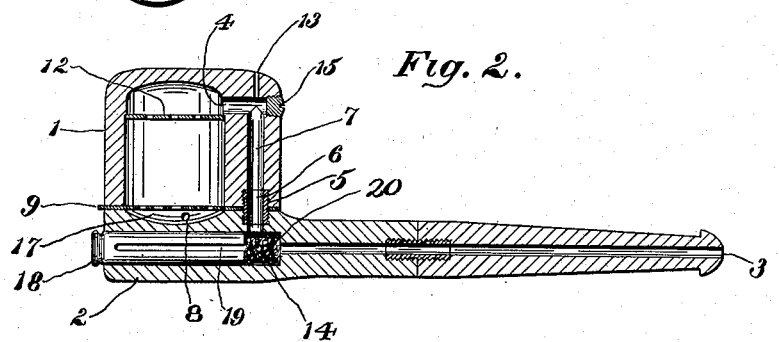
Figure 4:
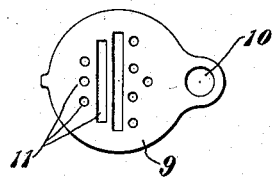
Figure 3:
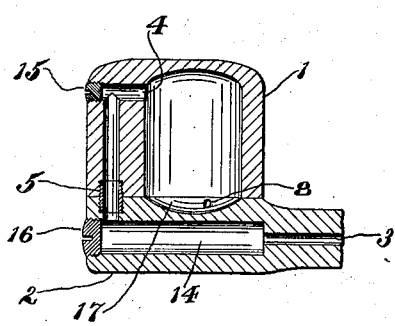

Of the drawings: Figure 1 is a perspective view of a pipe constructed in accordance with the principles of the invention with the bowl in the open position; Fig. 2 is a sectional view with the bowl in the closed position and showing additional parts; Fig. 3 is a sectional view showing a different arrangement of parts; and Fig. 4 is a detail of one feature of the invention.

Referring to the accompanying drawings, illustrating an embodiment of the invention, a pipe is shown having a bowl part 1 and a part 2 shaped to close the bowl and having an outlet aperture 3, through which the smoke may pass from the ignited tobacco in the pipe bowl directly to the mouth of the smoker or indirectly thereto through a further conveyer. The bowl 1 and the part 2 which is adapted to close the bowl are relatively movable so that the bowl may be opened and closed as desired. A suitable smoke passage from the bowl 1 to the outlet aperture 3 is provided. Connections between the bowl 1 and the part 2, which may be styled for brevity the shaped part, are provided to permit movement between said parts so that the bowl may be opened or closed and that there may be a smoke passage from the bowl to the outlet aperture 3 in both the opened and closed positions. I have chosen in the present embodiment to make said parts movable laterally, as shown in Fig. 1 and the particular form of connection shown herein is a pivotal connection 5 between said parts. The smoke passage is further shown in this embodiment as passing within said pivotal connection. An exteriorly threaded collar 6 is shown at the pivotal connection 5 threaded both into the bowl 1 and the part 2 and having its interior bored in line with the smoke passage 7. The smoke passage is further shown as passing along the bowl and entering it at 4 at the opposite end thereof.

It will thus be understood that the pipe can be opened as shown in Fig. 1 of the drawings, charged with tobacco, lighted, the smoke passage connecting the bowl and the outlet being operative to permit the smoker to draw on the pipe and ignite the tobacco thoroughly. The pipe may then be closed and smoked until the tobacco is entirely consumed.

Suitable means for supplying air are provided and in this embodiment ducts 8 are shown passing through the part 2 into communication with the interior of the bowl.

If desired, a guard plate 9 may be employed which may be movable to open or close the mouth of the bowl and will serve to retain the tobacco therein should the bowl be opened in the inverted position. Such plate, if used, may conveniently be pivoted concentrically with the bowl itself by means of an aperture 10. The plate 9 is shown provided with openings 11 to permit the air to pass therethrough. If desired also a perforate member 12 may be used between the smoke passage and the tobacco in the bowl to hold back the tobacco from the aperture 4 while permitting the smoke to pass therethrough.

According to one feature of the invention means for supplying cool air to the smoke are contemplated and in connection therewith a collecting chamber between the air supply and the outlet aperture 3. In the present embodiment, therefore, a cool air inlet 13 is shown between the bowl and the smoke outlet and it is further shown near the beginning of the smoke passage. There is also shown herein, located between the said air inlet 13 and the outlet aperture 3 a collecting chamber 14, and it may be conveniently located within the member 2. A screw threaded plug 15 is shown for giving access to the smoke passage and the adjacent end of the bowl for cleaning purposes and a similar member 16 for giving access to the collecting chamber 14. The member 2 is shown further provided with a dished part 17 opposite the bowl 1, which serves as a receptacle for certain of the deleterious products resulting from the combustion of the tobacco.

The invention contemplates in one of its aspects providing a frictional closure for the collecting chamber 14 and by one feature contemplates also providing an absorbent material 20 within said chamber. In the present embodiment a device combining these features is shown, comprising a member 18, preferably cylindrical, fitting friction tight into the chamber 14. Said member may be made of resilient material and is shown provided with a slot 19 therein, one purpose of which is to give a snug frictional fit in the chamber 18.

The safety and convenience of a pipe constructed in accordance with the principles of this invention will be apparent from what has already been stated, as the combustion takes place within a closed chamber which is at the same time readily opened either for charging, lighting or cleaning. Furthermore the combustion being at the bottom of the charge of tobacco, certain of the undesirable products of combustion are immediately received into the part 17 without coming in contact with the unburnt tobacco in the bowl of the pipe. Certain volatile elements which it is desired to eliminate, and which pass over with the smoke are condensed by the cool air entering at 13 and are received into the collecting chamber 14, while at the same time the air serves to lower the temperature of the smoke and thus enhance its flavor.

Where the chamber 14 is provided with a carrier having an absorbent material, the condensed elements referred to above are taken up by the absorbent material, and thus quickly and effectively removed from the pipe when desired.

It will be understood that the invention possesses other advantages some of which will be obvious herefrom and others learned through use of the invention.

While certain changes in form are shown herein it will be understood that same are illustrative rather than restrictive and that various changes in form may be made without departing from the principles of the invention as pointed out in the claims and without sacrificing the advantages of the invention.

What I do claim as my invention and desire to secure by Letters Patent, is:

1. A pipe including in combination a bowl part, a part shaped to close the bowl and having an outlet aperture, and a pivotal connection between said parts to open or close the bowl by a pivotal movement only and to have a smoke passage from the bowl to the outlet in both the open and closed positions.

2. A pipe including in combination a bowl part, a part shaped to close the bowl and having an outlet aperture, and a pivotal connection between said parts acting to open and close the bowl by a pivotal movement only and a smoke passage within said pivotal connection.

3. A pipe including in combination a bowl part, a part shaped to close the bowl and having an outlet aperture, a connection between said parts to permit movement therebetween to open or close the bowl and to have a smoke passage from the bowl to the outlet in both the open and closed positions, and a dished part in said shaped part opposite the bowl.

4. A pipe including in combination a bowl part, a part shaped to close the bowl and having an outlet aperture, a smoke passage from the opposite end of the bowl to said outlet, a dished part in said shaped part opposite the bowl, and connections between said bowl and shaped part to permit movement therebetween to open or close the bowl while preserving the smoke passage in both the open and closed positions.

5. A pipe including in combination a bowl part, a part shaped to close the bowl and having an outlet aperture, a smoke passage leading from the opposite end of the bowl to said outlet, and connections between said bowl and shaped part to permit movement therebetween to open or close the bowl by a pivotal movement only while preserving the smoke passage in both the open and closed positions.

6. A pipe including in combination a bowl, a part having an outlet aperture, a smoke passage leading from the bowl to the outlet, an air inlet between said bowl and said outlet, and a collecting chamber located between the inlet and the outlet.

7. A pipe including in combination a bowl, a part having an outlet aperture, a smoke passage leading from the bowl to the outlet, an air inlet between said bowl and said outlet, a collecting chamber located between the inlet and the outlet, and means for giving access to said chamber.

8. A pipe including in combination a bowl, a part having an outlet aperture, a smoke passage leading from the bowl to the outlet, an air inlet between said bowl and said outlet, a collecting chamber located between the inlet and the outlet, and a cartridge containing an absorbent material and fitting within said collecting chamber.

9. A pipe including in combination a bowl part, a part shaped to close the bowl and having an outlet aperture, a connection between said parts for pivotal movement therebetween to open or close the bowl and to have a smoke passage from the bowl to the outlet in both the open and closed positions and means for preventing other movement between the said bowl and said closing part.

10. A pipe including in combination a bowl part, a part shaped to close the bowl and having an outlet aperture, a smoke passage leading from the opposite end of the bowl to said outlet, said passage consisting of a plurality of communicating straight sections, and connections between said bowl and shaped part to permit movement therebetween to open or close the bowl while preserving the smoke passage in both the open and closed positions.

In testimony whereof, I have signed my name to this specification, in the presence of two subscribing witnesses.

JAMES A. IRVING.

Witnesses:
JOHN D. MORGAN,
FRED OPPENHEIMER.